Feb. 14, 1939.　　　H. S. GEORGE　　　2,147,367
WELDING PROCESS
Filed June 28, 1935　　　2 Sheets-Sheet 1
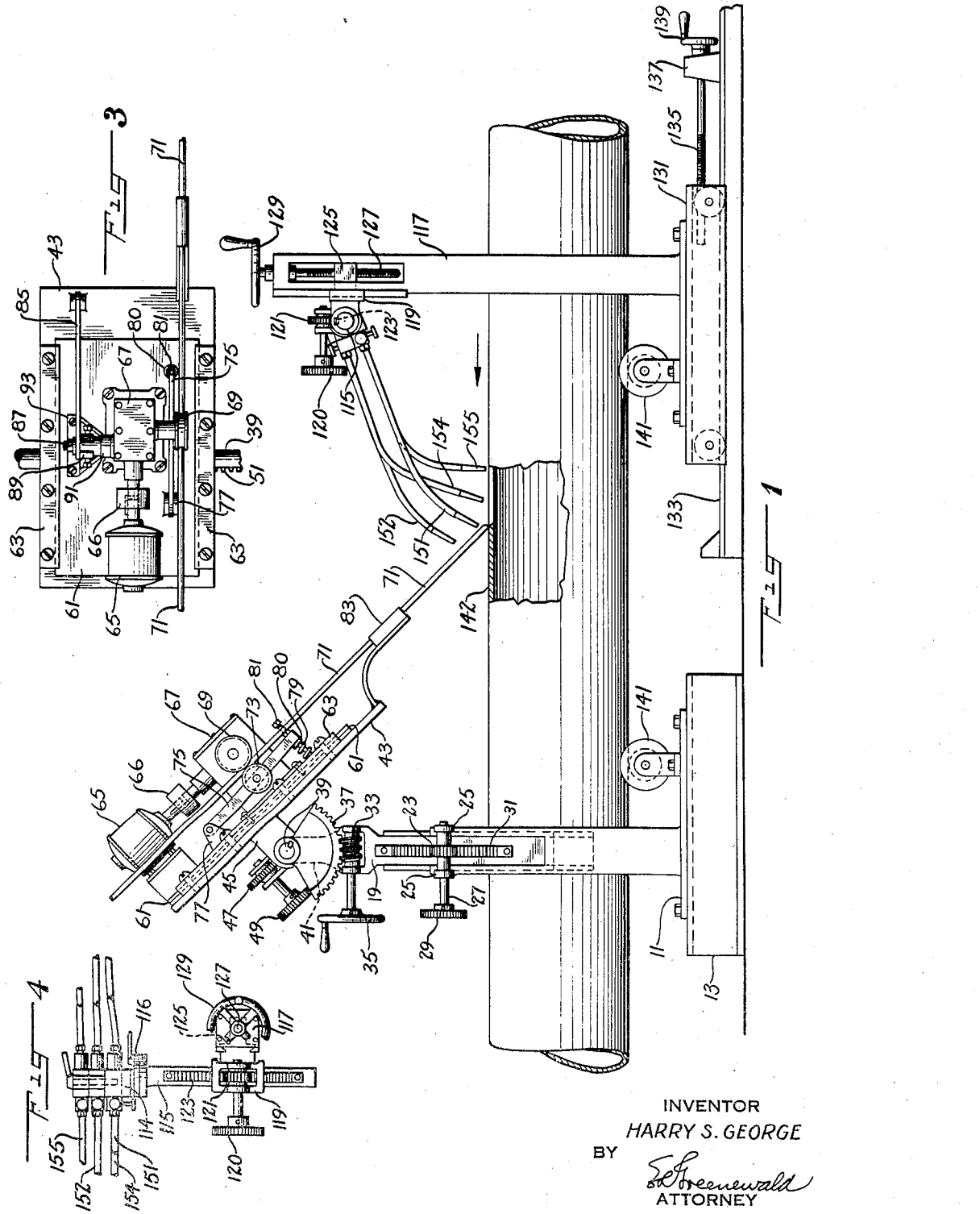
INVENTOR
HARRY S. GEORGE
BY
　ATTORNEY Feb. 14, 1939.  H. S. GEORGE  2,147,367
WELDING PROCESS
Filed June 28, 1935   2 Sheets-Sheet 2
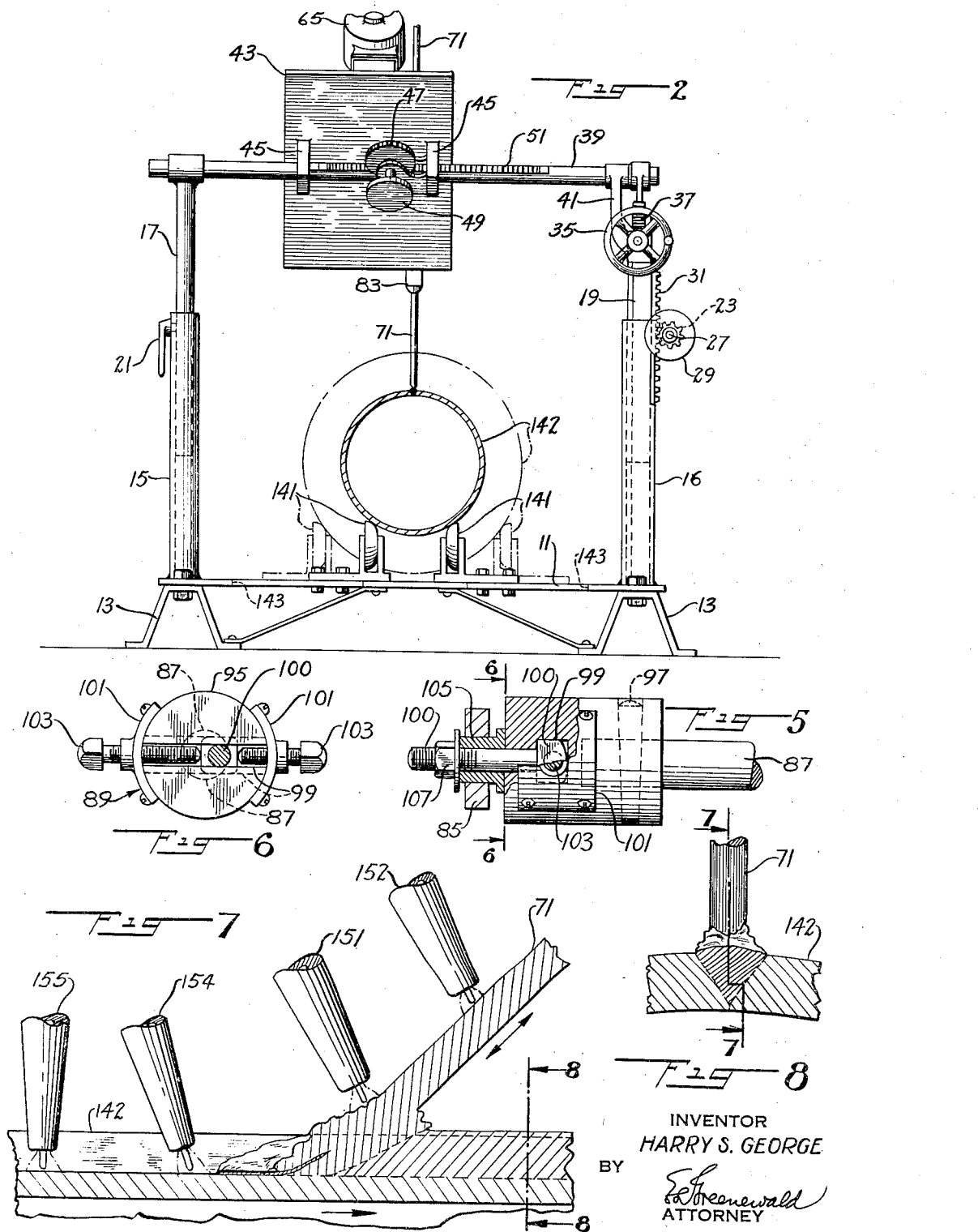
INVENTOR
HARRY S. GEORGE
BY
ATTORNEY Patented Feb. 14, 1939

2,147,367

UNITED STATES PATENT OFFICE 2,147,367

WELDING PROCESS

Harry S. George, Massapequa, N. Y., assignor, by mesne assignments, to Union Carbide and Carbon Corporation, a corporation of New York Application June 28, 1935, Serial No. 28,868

13 Claims. (Cl. 113—112)

The present invention relates to the joining of metal members by welding; and more especially it concerns a novel process and an automatic or semi-automatic apparatus adapted for the welding of steel and similar ferrous and other alloys, involving a welding operation in which the filler metal is applied in a mushy or plastic state to a prepared surface or base metal. In passing from its solidus to its liquidus metal passes through a mushy stage; and it is in such state that I apply and work the weld metal. The base metal preferably is not heated above its melting point, but the surface thereof is formed of a thin molten layer or film of a carbonaceous alloy of the base metal, melting below the melting point of the base metal. This preparation of the base metal may be effected by the method described in my U. S. Patent 1,973,341.

In welding methods generally employed prior to the invention set out in the said patent—in making a butt weld between two plates, for example—it has been customary to bevel the plate edges to be joined and to set them approximately parallel and almost touching. A so-called neutral welding flame was then applied to melt the walls of the V-shaped groove and to fill the latter with molten metal from a welding rod. In autogenous welding operations, the oxidizing character of this neutral flame is the source of numerous disadvantages among which are the following:

1. A sound autogenous weld frequently is prevented by molten metal from the puddle flowing over unmelted base metal having thereon a thin film of oxide.

2. In welding with the so-called neutral flame a considerable degree of superheating above the melting point is essential to insure sufficient fluidity of the metal to float out the particles of oxide produced. Too great a degree of superheating leads to excessive absorption of gas which is later evolved when the metal cools to its freezing point. This gas is often trapped in the mass of weld metal, forming blowholes. An excessive temperature also promotes oxidation of the deposited metal and adjacent parts of the base metal.

3. In using the neutral flame it is necessary to melt the points of the bevelled edges of the V, which usually allows the metal to run through. If these points are not melted sufficiently, incomplete penetration generally results and an improperly welded oxide-filled seam is left at the bottom of the V.

4. Under the oxidizing conditions that exist in fusion welding operations using a neutral flame, the alloying ingredients in the welding rod are depleted, and the carbon content is reduced to an undesirable extent. This raises the melting point of the filler metal and narrows its freezing range.

In accordance with the invention set out in my Patent 1,973,341, the objectionable features attendant the use of a neutral flame have been avoided by a treatment whereby the walls of the groove between the members to be welded are made to absorb carbon in preparation for receiving the filler material. In the preferred practice of that invention, the carbon absorption is integrated with the welding operation by utilizing an excess acetylene flame, such as one obtained from a gas mixture containing oxygen and acetylene in the approximate proportions of 97 to 100 or more. The invention described in the aforementioned patent involves melting a welding rod to form a puddle in contact with surfaces to be welded, which have thereon molten surface films of a carbonaceous alloy of the base metal melting at a temperature several hundred degrees below the melting point of the base metal, while the main body of the base metal is below its melting point. This carbonaceous alloy acts as a flux, reducing oxides, and preventing oxidation. This has now been found to obviate the necessity of melting the base metal to float off its oxide coating and overcoming the other disadvantages enumerated above.

The present invention is based in important part upon the discovery that it is possible to utilize the principle involved in the process disclosed in my above-mentioned patent for the autogenous welding of steel and other ferrous and non-ferrous alloys but employing conditions of temperature at which the base metal preferably is substantially below its melting point, and at which the main body of the filler, (or welding rod), is slightly below its melting point and lacks sufficient fluidity to conform to the surfaces of the contiguous parts of the base metal without mechanical assistance.

Among the important objects of the invention are the following: to provide for welding steel and other alloys by a novel process wherein both the base metal and the filler metal are below their respective melting points; to provide in a novel manner for preventing formation and inclusion of oxide in a welding zone during a welding operation; to provide for the employment of a mushy or plastic filler material in connection with an autogenous welding operation;

to provide in novel manner for mechanically forcing mushy or plastic welding material into a welding zone; to provide in novel manner for welding metals or alloys in any desired position, including those in which the filler metal is not held in place by the action of gravity; and to provide in novel manner for working or agitating the weld metal during its solidification in manner to produce a stronger, tougher weld, of metal having a fine grain structure.

In its broader scope the process features of the present invention involve the concurrent preparation of the base metal and of the weld metal, preferably by independently-controlled heating means, such as the oxy-acetylene torches hereinafter described. The torch or torches used in the preparation of the base metal or weld V preferably provide excess acetylene flames, which blanket the heated base metal and provide thereon a molten surface film of carbonaceous alloy. The torch or torches heating the weld metal are so arranged and operated that the body of weld metal at or adjacent its point of contact with the base metal is in a soft or mushy condition, but is not molten, or at most has thereon merely a thin surface layer of molten carbonaceous alloy. For effecting this purpose the torches preferably are operated with excess acetylene, although under some conditions certain of the preheating torches may employ a neutral flame.

During the welding operation, the metal members to be joined and the welding mechanism are moved relatively to each other along a predetermined path. During such movement the welding rod or filler material is rapidly axially reciprocated, the frequency and amplitude of the reciprocations being uniformly maintained during the welding operation. A blanket of reducing gases is maintained over the heated portions of the base metal and of the rod at all times during the welding operation, thus preventing the formation of oxides and, therefore, oxide inclusion in the body of the weld.

The axially reciprocating welding rod serves the additional important purpose of tamping or compacting the mushy welding metal into intimate contact with the molten superficial surface film of the prepared base metal. This compacting action, in addition to its important bonding effect upon the weld metal and base metal, serves the additional important function of improving the grain structure of the resulting weld and of producing a stronger and tougher weld, possibly due in part to the fact that the metal solidifies from a lower temperature than that at which it would solidify in fusion welding, and in part because of the agitation or working undergone by it while solidifying.

In order to secure the most satisfactory results in the employment of the present invention, the employment of automatic or semi-automatic mechanism is highly desirable for uniformly heating the welding rod and base metal, for providing a blanket of reducing gases adjacent the mushy weld metal, and for uniformly tamping and compacting the mushy weld metal upon the prepared metal surfaces to be joined.

In the accompanying drawings wherein is shown one form of automatic apparatus adapted for the practice of the process features of the invention;

Fig. 1 is a side elevation of one form of the welding rod-feeding apparatus and associated elements, parts being cut away;

Fig. 2 is an end elevation, partly in section, of the apparatus shown in Fig. 1, parts being omitted;

Fig. 3 is a plan view of one form of welding rod-feeding mechanism and associated parts;

Fig. 4 is a plan view of the adjustable welding head-carrying member shown in Fig. 1;

Fig. 5 is a side view of the eccentric member construction shown in Fig. 3, parts being broken away;

Fig. 6 is a vertical section along the lines 6—6 of Fig. 5, looking in the direction of the arrows;

Fig. 7 is a somewhat diagrammatic view of a welding operation, taken along the section line 7—7 of Fig. 8; and Fig. 8 is a transverse section through the welded zone, taken along the line 8—8 of Fig. 7, looking in the direction of the arrows.

Referring now to the drawings, numeral 11 designates generally a base plate supported on legs 13, 13. Mounted on the base plate at opposite sides thereof are vertical supporting members 15, 16, having adjustable members 17, 19 slidable therein. The member 15 is provided with a suitable clamp 21 for locking the member 17 in selected position.

The member 16 carries a pinion 23 secured upon a shaft 27 mounted in bearings 25, 25, and operated through the knurled wheel 29. The pinion 23 cooperates with a rack 31 on the member 19 for vertical adjustment of the latter.

A worm gear 33 is rotatably mounted on the upper margin of the member 19, and is regulatable through handwheel 35. The gear 33 meshes with a segmental gear 37 keyed to an end of a shaft 39 rotatably supported in bearings respectively carried upon the upper end of the member 17 and upon an arm 41 mounted upon the upper part of member 19.

A flat, normally-stationary support or platform 43 carried upon the shaft 39 has depending ears or flanges 45, 45, through apertures in which the shaft 39 is freely slidable. The construction of parts is such that while the platform is tiltable, no rotational movement thereof with respect to the shaft can occur. For facilitating lateral movement of the platform, a pinion 47 controlled by a knurled member 49 is mounted on a lateral extension on one ear 45, and engages a rack 51 carried by the shaft 39.

The welding rod-feeding mechanism comprises a freely movable platform 61 carried by the support 43 and adapted to be reciprocated upon the latter in a plane parallel to the axis of the shaft 39. The side margins of the platform 61 fit into lateral guides 63, 63 carried by the member 43.

Mounted on the movable platform 61 is a motor 65, operatively connected through a suitable coupling 66 and a set of reduction gears in a housing 67, with a peripherally-grooved roll or wheel 69 designed to engage the lateral surface of a welding rod 71 during a welding operation. The coupling 66 is rigidly secured to the main gear of housing 67; and the motor shaft also is so keyed to the coupling as to permit free relative longitudinal sliding movement of the shaft and coupling. A rigid coupling may be substituted for that shown. However, in instances where the motor is mounted elsewhere than on the movable platform, the slidable coupling or its equivalent is required. The motor 65 is preferably of the alternating current, universal type, capable of being operated at various selected speeds and of being reversed at will. A grooved idler roll or wheel 73 is mounted upon a lever 75 for rotation in the plane of rotation of the driven wheel 69. The lever 75 is pivotally connected at one of its ends to a post 77 mounted upon the movable platform 61. At the other end of the lever, a compression spring 79 is operatively interposed between the platform 61 and a disk or limiting member 80, secured to a bolt 81 having threaded engagement with the wall of an aperture extending through the lever. The construction is such that by turning the bolt 81 when the wheel 73 is resting against a welding rod, the compression exerted by the spring may be varied selectively to increase or decrease the pressure exerted upon the welding rod by the idler wheel 73. A welding rod guide 83 is mounted on the stationary platform 43.

For providing for the rapid axial reciprocation of the welding rod during feeding of the same to a welding operation, the motor 65 is operatively connected with a lever member 85 by means of reduction gearing housing 67, a countershaft 87, and an eccentric device 89 associated with the latter and with which the lever 85 is rotatably connected. The countershaft and eccentric device are supported in part by a sleeve bearing 91 carried on a standard 93. The lever 85 also is pivotally connected with the stationary platform 43.

The eccentric device comprises a cylindrical member 95 mounted centrally at an end of shaft 87 and secured thereto, as by a key 97. A T-shaped lateral groove 99 extends transversely of the member 95, and is adapted to accommodate a bolt or headed shaft 100 for lateral sliding movement therein, with the free end of the bolt extending beyond the end of the member 95. A pair of limiting plates 101, 101 close the lateral sides of the groove 99; and each plate is drilled and tapped to accommodate threaded adjusting screws or bolts 103, 103, the ends of which normally bear against opposite sides of the bolt 100 for lateral adjustment and locking in position of the latter. Carried by the member 100 is a bearing 105, upon which an end of the lever 85 is rotatably mounted. The degree of eccentricity imparted by the device 89 is regulated by lateral adjustment of the member 100 in the groove 99. A washer and a locknut 107, or their equivalents, insure maintenance of the selected degree of eccentricity and retain the lever in position.

For welding pipe, plates, or other materials to be joined, there may be provided a plurality of torches hereinafter described, adjustably carried by a supporting and locking member 114, mounted for rotation in a vertical plane upon the horizontal arm 115 and adapted to be locked in position by a member 116. The arm 115 is supported upon a standard 117 by means of a tubular collar 119 having rotatably mounted thereon a pinion 121 cooperating with a rack 123 on the arm 115 for moving the arm longitudinally of the standard under action of a wheel 129. The collar has a tongue portion fitting into a corresponding groove in a block member 125 having a sliding fit with a slotted portion of the standard for vertical movement. The block 125 has therein a threaded aperture adapted to receive the threaded shaft 127 of a rotatable adjusting member mounted on the standard and operated by a handwheel 129. The standard is mounted on a wheeled base 131 for limited movement on a fixed trackway 133 under action of a threaded screw 135 mounted in a block 137 for rotation when actuated by a handwheel 139.

Spaced pairs of rollers 141, 141, mounted respectively upon the bases 11 and 131 support the pipe 142 or other objects to be welded, for movement thereof past the welding heads and welding rod. The rollers 141 of each pair are laterally adjustable in slots 143 to adapt them to accommodate pipes or other members of different sizes.

When employing the apparatus illustrated, adapted for the continuous welding of pipe, a rheostat and a reversing switch may be arranged in the power circuit in series with the motor 65 in well-known manner. The rheostat may be provided with an indicating needle movable along a calibrated chart to regulate the motor speed. The usual switches and the indicator preferably are located close to the operator for convenient control.

The arm 115 carries a plurality of independently regulatable welding heads having nozzles 151 to 155, together with suitable connections for the regulated supply of combustible gas and oxygen to each nozzle.

In a preferred arrangement the rod preheating nozzles 151, 152 are directed to impinge their flames upon the lower portion of the welding rod. The nozzle 152 impinges its flame upon the welding rod at a point somewhat more remote from the scarf than the nozzle 151 and desirably at a smaller acute angle with respect to the direction of rod movement than the latter. The nozzle 151 is directed to impinge its flame upon the welding rod closely adjacent its lower end, and upon the pasty or mushy weld metal immediately below the rod. Preferably, an excess acetylene flame or other reducing flame is utilized in connection with nozzle 151; and likewise it may be utilized in nozzle 152, although this is not essential with respect to the last-named nozzle in which a neutral flame may be employed. The adjustment of the nozzles necessarily is such that the heat imparted thereby, to the welding rod, together with the heat flowing to the latter from the welding jets hereinafter described, is not such as to liquefy the said metal and produce a metal puddle or separate molten liquid phase, which could conform to the scarf without mechanical assistance.

For preparing the walls of the scarf in advance of the welding zone, there may be provided one or more welding nozzles. In the form shown, two of such nozzles 154 and 155 are employed. The nozzle 154 delivers an excess acetylene flame to the walls of the V at the welding zone, serving to heat and carburize the wall surfaces a short distance in front of the weld and to maintain a reducing atmosphere at the said zone and surrounding the lower end of the welding rod. The welding nozzle 155, which preferably also utilizes a carburizing flame, serves to preheat the base metal and prepare it for further treatment by the nozzle 154 in the manner indicated.

During a welding operation, using the apparatus shown, the pipe or material to be welded, and the carriage carrying the welding rod and associated mechanism, are moved relatively to each other. Preferably the pipe is moved along upon the rollers 141, 141 by suitable means (not shown). Prior thereto, the abutting margins of the pipe at the seam to be welded have been bevelled in well known manner to form a scarf. The welding rod-feeding mechanism has been positioned by means of member 29, 35 and 49 so as to direct the welding rod into the scarf at the desired angle;—and the torches have been properly positioned in the manner previously indicated, by means of the members 114, 120, 129 and 139.

As the parts to be welded pass into the welding zone at the scarf adjacent the tip 151, mushy or pasty weld metal at the lower end of the welding rod 71 is forced into the scarf, which previously has been brought up to proper temperature and has been provided with a surface film or coating of liquid carbonaceous alloy by the nozzles 154 and 155. At all times during the existence of the weld metal in the mushy state, it is isolated from the atmosphere by a reducing atmosphere.

The rapid reciprocations of the welding rod in the scarf act as a high-speed, uniform tamping means to force the mushy metal into intimate contact with the film of alloy upon the prepared walls of the scarf at the welding zone, thus facilitating an indissoluble union of the weld metal and base metal. While reciprocations of about 40 to 60 cycles per minute generally are desirable, wide variations from this rate are possible within the scope of the invention. This agitation of the mushy metal during the first stages of solidification thereof causes the development of a fine grain structure in the weld metal acting to increase its toughness and to produce a very strong weld. The maintenance of a reducing atmosphere at all times at the welding zone insures the freedom of the weld from oxides, and under certain conditions it facilitates the formation of a surface film or coating of liquid carbonaceous alloy on the mushy weld metal.

The welding rod 71 continuously is fed forward by the members 69, 73, at a rate substantially corresponding to the rate of its consumption in the welding operation. The rate of linear movement of the welding rod is regulated by adjusting the speed of the motor by means of a rheostat or the equivalent (not shown). Concurrently, a secondary or axially reciprocating movement of the welding rod is effected during operation of the motor, the amplitude of which is controlled by adjusting the set screws 103, 103 of the eccentric device. The frequency of the axial reciprocation is controlled by adjusting the motor speed in the manner indicated, or by employing a selective transmission in place of the simple reduction gears in housing 67. By calibrating the rheostat it is possible to secure instantly the conditions of welding rod feed rate and oscillation frequency found most suitable for use with any particular size and kind of pipe, plate, or other object to be welded.

Other forms of aparatus in addition to that shown may be employed for the practice of the invention. Such apparatus, however, should include means for properly preheating the respective welding rod and base metal, under such conditions that the plastic or mushy metal at the welding zone and immediately adjacent thereto, remains under a blanket of reducing gases. Mechanism also is required for the controlled reciprocation of the welding rod in the regulated manner hereinbefore described, together with means for uniformly moving the parts to be welded, and the welding rod and associated parts, at a uniform rate with respect to each other.

While I have indicated separate drives for the rod-feeding mechanism and for the conveying means for the materials being welded, it will be obvious that both of these may be driven by the same mechanism or by synchronous mechanisms.

The motor may be mounted directly upon the stationary support 43, or elsewhere, being connected with the gears in housing 67 by a flexible drive connection. The rheostat control permits occasional variations in the speed of the rod-feeding mechanism to compensate, when necessary, for ordinary irregularities in a welding operation. Ready reversal of the direction of rod feed, for retracting the rod from the scarf, is effected by means of a reversing switch (not shown).

In the event of an incipient slight sticking of the rod due to any sudden tendency of the metal toward undue solidification, the pull or thrust produced by the secondary or reciprocating motion, being in line with the axis of the rod, is little liable to bend the rod at the highly-heated end. However, in such an emergency, slippage occurs at the feed rolls 69, 73, when the yielding frictional feeding action of these rolls upon the rod, regulated by the spring 79, has been overcome. Any such tendency toward sticking of the rod is overcome immediately thereafter by the additional heat flowing to the welding zone and parts adjacent thereto from the respective nozzles.

The uniform secondary or reciprocating motion of the welding rod with an amplitude of at least about ⅛ inch is practically indispensable in connection with the use of mechanically-fed welding rods where the rod is inclined with respect to the work. Homogeneous and sound welds thus are produced by the resultant agitation of the plastic or mushy weld metal in the V and by the action of the rod in forcing or compacting the mushy mass into intimate contact with the walls of the V. These walls previously have been brought to the proper temperature and have been provided with a film of molten bonding metal in the form of a relatively high carbon alloy.

Since any oxide film on the base metal is eliminated by the molten film on the surface of the groove just ahead of the progressing weld, the formation of laps is prevented, particularly at the bottom of a single V weld. Moreover, the points of the bevelled edges of the members to be united are not melted by the torch flame. Hence, there is no formation of metal beads on the underside of the seam.

It is within the scope of the invention to melt the top of the finished weld immediately following its formation where such melting is desirable to provide a smooth surface; or such surface may be formed by mechanical means, as by hammering.

The chemical composition and alloying ingredients of a steel welding rod suitable for use in the present process may vary considerably; a type of welding rod generally satisfactory for welding steel may contain carbon from .05 to .50%; manganese from .50 to 1.75%; and silicon from .20 to 1.50%. It should be clean and free from oxides.

By the practice of the present invention it readily will be seen that it is possible to produce sound welds of great toughness and strength in any position of the members to be joined. Such welds may be produced even in overhead or in vertical welding, whereas in prior mechanical welding processes involving the maintenance in place of a fluid puddle of weld metal the filler metal cannot thus be controlled in overhead welding or in vertical welding. Furthermore, in the present invention there exists no tendency for the filler metal to flow irregularly ahead of the rod and get out of control, as in the usual fusion welding operations. It will be obvious that less heat is required in the welding operation employed in the present invention than in the usual processes where the rod quickly must be brought to its melting temperature. Likewise, less heat is required for the preheating of the base metal than is required for the usual fusion welding operations.

Satisfactory results may be secured in some instances under conditions whereby the welding rod is not reciprocated, but where simple linear motion of the rod to the welding zone is employed both for the feeding and compacting operations.

An electric arc or similar heating unit may be substituted for the nozzles 151, 152, for converting the welding rod to the plastic or mushy state. In such instances the weld metal and base metal at the welding zone are surrounded as usual by an atmosphere of reducing gases preferably produced by the nozzle 154 and/or nozzle 155.

This application is a continuation-in-part of my copending application, Serial No. 729,078, filed June 5, 1934, for "Welding process and apparatus."

The invention is susceptible of modification within the scope of the appended claims.

I claim:

1. Process of welding which comprises supporting a welding rod at a selected acute angle with respect to the surfaces at a welding zone of members to be united, maintaining a body of plastic weld metal in the said welding zone in the presence of a reducing atmosphere, reciprocating the said welding rod axially thereof to provide uniform reciprocations of small amplitude and regulated frequency while concurrently feeding the rod continuously forward to the welding zone at a rate substantially corresponding to the rate of consumption of the rod at the said zone, and discontinuing the said feed when the resistance thereto exceeds a selected maximum.

2. Process of welding which comprises supporting a welding rod at a selected acute angle with respect to the surfaces at a welding zone of members to be united, maintaining a body of plastic weld metal in the said welding zone in the presence of a reducing atmosphere, reciprocating the said welding rod axially thereof to provide uniform reciprocations of small amplitude and regulated frequency while concurrently feeding the rod continuously forward to the welding zone at a rate substantially corresponding to the rate of consumption of the rod at the said zone, and discontinuing the said feed and the reciprocation of the welding rod when resistance thereto exceeds a selected maximum.

3. Process of welding which comprises supporting a welding rod at a selected acute angle with respect to the surfaces at a welding zone of members to be united, maintaining a body of plastic weld metal in the said welding zone in the presence of a reducing atmosphere, reciprocating the said welding rod axially thereof to provide uniform reciprocations of small amplitude and regulated frequency while concurrently feeding the rod continuously forward to the welding zone at a rate substantially corresponding to the rate of consumption of the rod at the said zone, and regulating the amplitude of the reciprocations independently of the rate of forward movement of the welding rod.

4. Process of welding which comprises supporting a welding rod at a selected angle with respect to the surfaces at a welding zone of members to be united, maintaining in its mushy stage a body of weld metal in the said welding zone in the presence of a reducing atmosphere, and reciprocating the said welding rod axially thereof to provide uniform reciprocations of small amplitude and regulated frequency while concurrently feeding the rod continuously forward to the welding zone at a rate substantially corresponding to the rate of consumption of the rod at the said zone.

5. Process of welding which comprises supporting a welding rod at a selected angle with respect to the surfaces at a welding zone of members to be united, maintaining in its mushy stage a body of weld metal in the said welding zone, and reciprocating the said welding rod axially thereof to provide uniform reciprocations of small amplitude and regulated frequency while concurrently feeding the rod continuously forward to the welding zone at a rate substantially corresponding to the rate of consumption of the rod at the same zone.

6. In a welding process, the steps of progressively feeding a welding rod to a welding zone maintained in a reducing atmosphere containing in its mushy stage a body of weld metal disposed between contiguous parts to be joined, converting a portion of the metal of the said rod to a mushy stage, forcing the said weld metal in its mushy stage under regulated pressure into intimate welding contact with the said body of metal in its mushy stage and with the said contiguous parts, preventing conversion of the welding rod and said parts to a liquid state, and then cooling to complete the welding process in accordance with which the force utilized to produce the said intimate welding contact of weld metal and said contiguous parts is applied by axially reciprocating said welding rod.

7. In a welding process, the steps of progressively feeding a welding rod to a welding zone containing in its mushy stage a body of weld metal disposed between highly heated contiguous parts, converting a portion of the metal of the said rod to its mushy stage, forcing the resultant weld metal in its mushy stage under regulated pressure into intimate welding contact with the said body of metal in its mushy stage and with the said contiguous parts while agitating the said body by means of said rod, preventing conversion of the welding rod and said parts to a liquid state during the welding process, and cooling to complete the welding process.

8. Process of producing a welded seam uniting edges of metal structural members, which comprises shaping the edges to be united, placing such shaped edges in opposed relation to form a groove, progressively applying to the surfaces forming said groove at least one oxy-acetylene flame in which the volume of supplied acetylene sufficiently exceeds the volume of supplied oxygen to cause successive portions of such highly heated surfaces to absorb carbon from said flame and spontaneously melt superficially at a lower temperature than the melting temperature of said members, simultaneously converting filler metal to its mushy stage while maintaining it in a reducing atmosphere, progressively agitating the mushy metal while placing the same into intimate welding contact with the said surfaces under a rapid succession of light impacts while preventing the main body of mushy weld metal from reaching its liquidus, and then cooling the mushy weld metal to complete the process.

9. A welding process which comprises progressively heating in a reducing atmosphere, contiguous parts to be welded: heating a welding material until it reaches its mushy stage; and simultaneously progressively forcing the weld material while maintained in its mushy stage into intimate welding contact with the heated parts under a rapid succession of regulated impacts in the presence of said reducing atmosphere.

10. In a welding process, the steps of feeding a welding rod to a welding zone containing in its mushy stage a body of weld metal in a V maintained in a reducing atmosphere, directing the said rod at an acute angle with respect to the surface of work at the said zone, actively agitating the body of metal in its mushy stage, mechanically forcing weld metal in its mushy stage into the V and against the walls of the V while maintaining the weld metal in its mushy stage, and then cooling said weld metal to complete the process.

11. In a welding process, the steps of feeding a welding rod to a welding zone containing in its mushy stage a body of weld metal in a V, directing the said rod at an acute angle with respect to the surface of work at the said zone, actively agitating the body of metal while in its mushy stage, mechanically forcing weld metal in its mushy stage into the V and against the walls of the V by axially reciprocating the welding rod along a selected path having a length of not substantially less than ⅛ inch while preventing conversion of the mushy weld metal to its liquidus, and immediately thereafter cooling said weld metal to complete the welding process.

12. Welding process, which comprises feeding solid weld metal to a welding zone containing a carburizing atmosphere while concurrently converting said metal to its mushy stage and while said metal is cooling through its mushy stage to its solidus, tamping said mushy weld metal into intimate welding contact with the carburized surfaces of two metal members to be united, and during the process maintaining the weld metal in its mushy stage and the main body of each of said metal members at temperatures below their melting points.

13. Process of uniting metal members, which comprises progressively applying high temperature heat to successive portions of contiguous surfaces of said members maintained in a reducing atmosphere, thereby providing thereon thin carburized surface films, simultaneously feeding a metal welding rod to such carburized films while progressively converting said rod to its mushy stage and while said weld metal is cooling through its mushy stage tamping the metal upon said carburized surface films of said successive portions, and preventing formation of a pool of liquid metal during the process.

HARRY S. GEORGE.